United States Patent Office 3,304,319
Patented Feb. 14, 1967

3,304,319
TETRA(TRIALKYLSILYL)CYCLOHEXENE DERIVATIVES AND PROCESS OF PREPARATION
Donald R. Weyenberg, Midland, Mich., assignor to Dow Corning Corporation, Midland, Mich., a corporation of Michigan
No Drawing. Filed Jan. 14, 1963, Ser. No. 251,048
10 Claims. (Cl. 260—448.2)

This invention relates to new cyclohexene derivatives selected from the group consisting of phenyltetra(trialkylsilyl)cyclohexenes and t-butyltetra(trialkylsilyl)cyclohexenes, wherein the alkyl groups each contain from 1 to 7 inclusive carbon atoms.

The compounds of this invention are particularly useful as heat transfer agents because of their thermal stability. They are also useful as cutting fluids, lubricants and as hydraulic fluids.

It has been found quite unexpectedly by applicant that the reaction of biphenyl, a metal selected from the group consisting of sodium and lithium, a trialkylchlorosilane and a solvent selected from the group consisting of tetrahydrofuran, 1,2-dimethoxyethane and 2-methoxyethylether yields as the major product a phenyltetra(trialkylsilyl)cyclohexene. For example, when trimethylchlorosilane is used, the product is phenyltetra(trimethylsilyl)-cyclohexene.

It has also been found quite unexpectedly by applicant that the reaction of t-butylbenzene, a metal selected from the group consisting of sodium and lithium, a trialkylchlorosilane and a solvent selected from the group consisting of tetrahydrofuran, 1,2-dimethoxyethane and 2-methoxyethyl ether yields as the major product t-butyltetra(trialkylsilyl)cyclohexene. For example, when trimethylchlorosilane is used, the product is t-butyltetra(trimethylsilyl)cyclohexene.

The compounds of this invention can be prepared by the in situ reaction of the three materials. The phenyltetra(trialkylsilyl)cyclohexenes can also be prepared by first reacting the biphenyl with the metal and then reacting the metallo compound formed with the trialkylchlorosilane. The in situ preparation is the preferred method.

The products of this invention can be a mixture of the various position isomers possible for the compounds.

The alkyl groups can be, for example, methyl, ethyl, propyl, butyl, amyl, hexyl, heptyl, isopropyl or isobutyl. It is preferred that at least two of the alkyl groups are methyl.

The following examples are given for purposes of illustrating the invention and should not be construed as limiting it.

Example 1

15 g. of sodium, 154 g. (1 mole) of biphenyl and 1 liter of 1,2-dimethoxyethane were placed in a 2-liter, 3-neck flask equipped with stirrer, reflux condenser and separatory funnel and vented to the atmosphere through a Gilman sulfuric acid trap. The solution became deep green after 10 minutes of stirring. Trimethylchlorosilane was added intermittently every 2 to 5 minutes until the green color disappeared. Simultaneously additional sodium was added every 20 to 30 minutes. A total of 235 g. (2.16 moles) of trimethylchlorosilane and 50 g. (2.2 moles) of sodium (including the original 15 g.) were added over a 5 hour period. After stirring overnight, the slurry was filtered and the residue washed with diethylether. Distillation of the filtrate and diethylether washings yielded 132 g. of crude phenyltetra(trimethylsilyl)-cyclohexene (B.P. 146–148° C./0.3 mm.). The product had a refractive index of $n_D^{25}$ 1.5173–4.

After standing several days, a crystalline solid separated from the viscous liquid obtained above. The crystalline solid was recrystallized from methyl alcohol. The recrystallized product was found to have a melting point of 97–98.5° C. This is a pure form of phenyltetra(trimethylsilyl)cyclohexene.

Example 2

The above experiment was repeated using 154 g. (1 mole) of biphenyl, 432 g. (4 moles) of trimethylchlorosilane, 115 g. (5 moles) of sodium and 1½ liters of tetrahydrofuran. Distillation of the filtrate and washings yielded 300 g. of crude phenyltetra(trimethylsilyl)cyclohexene. Careful redistillation of the crude material yielded 75 g. of a crystalline product (B.P. 202–204° C./7 mm.). Recrystallization of the crystalline product from methyl alcohol yielded 62 g. of a solid having a melting point of 95–96° C. Analysis of the product for percentage composition gave the correct silicon, carbon and hydrogen analyses for phenyltetra(trimethylsilyl)cyclohexene.

Example 3

Into a flask equipped with stirrer, condenser, thermometer, drying tube and addition funnel were placed 25 g. of lithium sand (80 percent Li), 300 ml. of tetrahydrofuran, 134 g. (1 mole) of t-butyl benzene and 216 g. (2 moles) of trimethylchlorosilane. This mixture was stirred at room temperature for 20 days and then was filtered. Distillation of the filtrate yielded 105.5 g. t-butyltetra(trimethylsilyl)cyclohexene (B.P. 120° C./0.3 mm.). The material had a melting point of 126–130° C. The product was recrystallized from methyl alcohol. Analysis of the recrystallized product for percentage composition gave the correct silicon, carbon and hydrogen analyses for t-butyltetra(trimethylsilyl)cyclohexene.

Example 4

When the trialkylchlorosilanes listed below are substituted for the trimethylchlorosilane of Example 1, the corresponding phenyltetra(trialkylsilyl)cyclohexenes are obtained.

| | Silane | Cyclohexene |
|---|---|---|
| (a) | Dimethylethylchlorosilane | Phenyltetra(dimethylethylsilyl)cyclohexene. |
| (b) | Dimethylhexylchlorosilane | Phenyltetra(dimethylhexylsilyl)cyclohexene. |
| (c) | Dimethylheptylchlorosilane | Phenyltetra(dimethylheptylsilyl)cyclohexene. |

Example 5

When the trialkylchlorosilanes listed below are substituted for the trimethylchlorosilane of Example 2, the corresponding phenyltetra(trialkylsilyl)cyclohexenes are obtained.

| | Silane | Cyclohexene |
|---|---|---|
| (a) | Methylethylpropylchlorosilane | Phenyltetra(methylethylpropylsilyl)cyclohexene. |
| (b) | Dimethylisopropylchlorosilane | Phenyltetra(dimethylisopropylsilyl)cyclohexene. |

Example 6

When the trialkylchlorosilanes listed below are substituted for the trimethylchlorosilane of Example 3, the corresponding t-butyltetra(trialkylsilyl)cyclohexenes are obtained.

| | Silane | Cyclohexene |
|---|---|---|
| (a) | Dimethylbutylchlorosilane | t-Butyltetra(dimethylbutylsilyl)cyclohexene. |
| (b) | Dimethylamylchlorosilane | t-Butyltetra(dimethylamylsilyl)cyclohexene. |

That which is claimed is:

1. A composition of matter selected from the group consisting of phenyltetra(trialkylsilyl)cyclohexenes and t-butyltetra(trialkylsilyl)cyclohexenes in which each alkyl group contains from 1 to 7 inclusive carbon atoms.

2. As a composition of matter, a phenyltetra(trialkylsilyl)cyclohexene, in which each alkyl group contains from 1 to 7 inclusive carbon atoms.

3. Phenyltetra(trimethylsilyl)cyclohexene.

4. As a composition of matter, a t-butyltetra(trialkylsilyl)cyclohexene in which each alkyl group contains from 1 to 7 inclusive carbon atoms.

5. t-butyltetra(trimethylsilyl)cyclohexene.

6. The method of preparing phenyltetra(trialkylsilyl)cyclohexenes wherein the alkyl groups each contain from 1 to 7 inclusive carbon atoms, said method comprising reacting (1) biphenyl, (2) a metal selected from the group consisting of sodium and lithium, and (3) a trialkylchlorosilane wherein the alkyl groups each contain from 1 to 7 inclusive carbon atoms, in a solvent selected from the group consisting of tetrahydrofuran, 1,2-dimethoxyethane and 2-methoxyethyl ether.

7. The method of preparing phenyltetra(trimethylsilyl)cyclohexene which comprises reacting biphenyl, a metal selected from the group consisting of sodium and lithium and trimethylchlorosilane in a solvent selected from the group consisting of tetrahydrofuran, 1,2-dimethoxyethane and 2-methoxyethyl ether.

8. The method of claim 7 wherein the metal is sodium.

9. The method of claim 8 wherein the solvent is 1,2-dimethoxyethane.

10. The method of claim 8 wherein the solvent is tetrahydrofuran.

References Cited by the Examiner
UNITED STATES PATENTS 3,105,085  9/1963  Toporcer _____ 260—448.2

TOBIAS E. LEVOW, *Primary Examiner.*

SAMUEL H. BLECH, HELEN M. McCARTHY,
*Examiners.*

P. F. SHAVER, *Assistant Examiner.*